United States Patent [19]
Ehrens et al.

[11] 3,725,757
[45] Apr. 3, 1973

[54] STARTING CIRCUIT FOR PERMANENT SPLIT CAPACITOR MOTOR

[75] Inventors: Henry Ehrens, Bayside, N.Y.; Charles W. Slocum, Spring Lake Heights, N.J.

[73] Assignee: Thermo-Electronics, Inc., Allenwood, N.J.

[22] Filed: May 13, 1971

[21] Appl. No.: 143,016

[52] U.S. Cl. .........318/221 C, 318/221 D, 318/221 H
[51] Int. Cl. ...............................................H02p 1/44
[58] Field of Search.........................318/220 R, 318/221 R, 221 C, 221 D, 221 H

[56] References Cited
UNITED STATES PATENTS

| | | | |
|---|---|---|---|
| 2,593,268 | 4/1952 | Clark | 318/221 H |
| 3,293,519 | 12/1966 | Dresser | 318/221 R |

FOREIGN PATENTS OR APPLICATIONS

| | | | |
|---|---|---|---|
| 375,180 | 6/1932 | Great Britain | 318/221 H |
| 591,763 | 1/1934 | Germany | 318/221 H |

Primary Examiner—Gene Z. Rubinson
Attorney—Hood, Gust, Irish, Lundy & Coffey

[57] ABSTRACT

A starting circuit for a permanent split capacitor motor having a main field winding, a starting field winding, a running capacitor, and a supplementary starting capacitor. A thermal relay is provided having normally closed switch contacts coupling the supplementary starting capacitor across the running capacitor and a bimetallic element serially coupled with the starting winding and running capacitor across the main winding. The bimetallic element opens the switch contacts thereby to disconnect the starting capacitor in response to a first predetermined current flow in the starting wind-ing circuit and maintains the switch contacts open in response to a lower current flow.

3 Claims, 5 Drawing Figures

PATENTED APR 3 1973 3,725,757

INVENTORS:
HENRY EHRENS
CHARLES W. SLOCUM

BY, Hood, Gust, Irish,
Lundy & Coffey
ATTORNEYS

STARTING CIRCUIT FOR PERMANENT SPLIT CAPACITOR MOTOR

BACKGROUND OF THE INVENTION

1. Field of the Invention

This invention relates generally to permanent split capacitor motors, and more particularly to a permanent split capacitor motor having a supplemental starting capacitor which is disconnected upon starting the motor.

2. Description of the Prior Art

Single phase, alternating current induction motors of the distributed winding type conventionally include a main field winding and a starting field winding, the two windings being angularly displaced on a stator core and being energized, respectively, by phase-displaced currents in order to provide starting torque. In one form of single phase induction motor, referred to as resistance-split, the starting winding has a higher resistance than the main winding and may have additional resistance connected in series therewith, the difference in the resistance of the respective main and starting winding circuits thus providing the requisite phase-displacement. In another common form of single phase induction motor, the requisite phase-displacement is provided by means of a capacitor coupled in series with the starting winding. In some single phase motors, the starting winding is disconnected from the circuit and thus is de-energized when the motor reaches a predetermined speed, as by a speed-responsive switch or a current or voltage-responsive relay.

In another common form of single phase motor, referred to as a permanent-split capacitor motor, the starting winding and its associated capacitor are permanently connected and remain energized during operation of the motor. For such reasons as improved power factor and elimination of the starting switch mechanism, permanent split capacitor motors are commonly employed for driving the compressor of room air conditioning systems in which the motor and compressor are hermetically sealed in the refrigeration system. The locked rotor or starting torque of a conventional permanent split capacitor motor may be insufficient to start the compressor under low voltage conditions. Where low voltage conditions may exist, a supplementary starting capacitor may be coupled in parallel with the running capacitor during starting, such starting capacitor thus increasing the starting torque by increasing the phase-displacement, and being disconnected immediately upon starting of the motor and compressor. Manifestly, a conventional centrifugal switch mechanism cannot be employed for this purpose in a hermetic motor.

Two systems have commonly been employed for disconnecting the supplementary starting capacitor upon starting of the motor. In one such system, a potential relay is employed having its operating coil coupled across the starting winding and having normally closed contacts coupling the supplementary starting capacitor across the running capacitor. Thus, when the voltage across the starting winding reaches a predetermined value, the relay contacts are opened thereby disconnecting the supplementary starting capacitor from the circuit. The voltage across the starting winding remains sufficiently high during operation of the motor to maintain the operating coil of the potential relay energized and thus, the relay contacts remain open so as to disconnect the starting capacitor until removal of the source of power. A resistor coupled across the supplementary starting capacitor discharges the capacitor during the running operation. However, if a momentary interruption in the line voltage occurs during or immediately following starting and before the supplementary starting capacitor has been discharged, the switch contacts will be momentarily closed and opened with the result that the charge of the capacitor plus the line voltage is applied across the switch contacts and may weld the contacts causing failure of the switch.

In a second common system, a current-responsive relay is provided having its operating coil coupled in series with the main winding and having normally open switch contacts connecting the supplementary starting capacitor across the running capacitor. When the motor is initially energized, the current flow in the main winding is sufficiently high to cause the relay contacts to close thereby coupling the supplementary starting capacitor across the running capacitor so as to increase the starting torque of the motor. As the motor comes up to speed, the current in the main winding falls to a much lower value thus opening the relay contacts to disconnect the supplementary starting capacitor, a resistor coupled across the supplementary starting capacitor again discharging that capacitor during the running operation. However, the main winding starting current can exceed 35 amperes and thus the operating coil of the current relay in series with the main winding will have a substantial voltage drop thereacross which further aggravates any low voltage condition which may exist. Further, the current-responsive relay is subject to the same disadvantage as the potential relay in that a momentary interruption in the line voltage during or immediately following starting of the motor causes opening and closing of the switch contacts with a resulting tendency to weld the contacts.

Both the potential relay and current-responsive relays are position conscious, i.e., either relay must be attached to the motor in a predetermined position.

SUMMARY OF THE INVENTION

In accordance with the invention, we employ a thermal relay for opening normally closed switch contacts connecting the supplementary starting capacitor across the running capacitor, the relay being actuated by a bimetallic element in the starting circuit. Thus, once the switch contacts are opened by the bimetallic element, they will remain opened, despite interruption in the line voltage, during the cooling time of the bimetallic element thus permitting the supplementary starting capacitor to at least partially discharge through the parallel-connected resistor thereby preventing welding of the switch contacts due to capacitor discharge current.

The invention, in its broader aspects, provides a starting circuit for a permanent split capacitor, single phase alternating current induction motor having a main field winding, means for coupling the main winding across a source of single phase, alternating current potential, a starting field winding, a running capacitor, a supplementary starting capacitor, normally closed switch contacts coupling the supplementary starting capacitor across the running capacitor, and means for discharging the supplementary starting capacitor when the contacts are opened. The starting circuit comprises circuit means serially coupling the running capacitor and the starting winding for energization across the main winding, and thermally-responsive means coupled in the circuit means for opening the switch contacts in response to a first predetermined current flow in the circuit means and for maintaining the switch contacts open in response to a second predetermined current flow less than the first current flow.

It is accordingly an object of the invention to provide an improved starting circuit for a permanent split capacitor motor.

Another object of the invention is to provide an improved starting circuit including a supplementary starting capacitor for a permanent split capacitor motor.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 1:
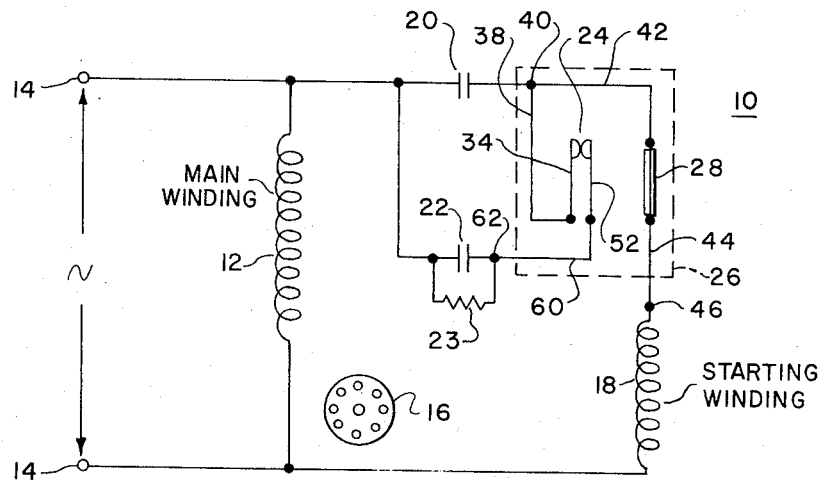
FIG. 1 is a schematic illustration showing the improved permanent split capacitor motor starting circuit of the invention.

Referring now to FIG. 1, there is shown schematically a permanent split capacitor motor, generally indicated at 10, having a main field winding 12 directly connected across external terminals 14 which are adapted to be connected to a source of single-phase, alternating current potential. Main winding 12 is formed of a plurality of coils distributed in the slots of a stator core member (not shown), the slots communicating with a bore in which squirrel cage rotor 16 is rotatably positioned. Starting winding 18 is provided also formed of a plurality of coils distributed in the stator core member slots and angularly displaced from main winding 12, such as by 90° in the case of a two pole motor. Running capacitor 20 is provided serially coupled with starting winding 18 across main winding 12.

Supplementary starting capacitor 22 is provided having discharging resistor 23 connected thereacross. Supplementary starting capacitor 22 is connected across running capacitor 20 by normally closed contacts 24 of thermal relay 26, contacts 24 being actuated by bimetallic element 28 connected in series between starting winding 18 and running capacitor 20.

It will now be observed that contacts 24 are closed when motor 10 is de-energized thus coupling supplementary starting capacitor 22 across running capacitor 20 so as to increase the starting torque of the motor upon energization thereof. Upon energization of motor 10, bimetallic element 28, being coupled in series with starting winding 18, is heated by the current therein. Bimetallic element 28 flexes due to heating and actuates contacts 24 to open the same in response to a predetermined current flow in starting winding 18 thereby disconnecting supplementary starting capacitor 22 from the circuit. The current flowing in starting winding 18 now falls to a lower predetermined value which, however, is still of sufficient magnitude to maintain bimetallic element 28 in a flexed position so as to maintain contacts 24 open during continued operation of motor 10. Following opening of contacts 24 and during normal operation of motor 10, supplementary starting capacitor 22 is discharged through resistor 23.

It will now be seen that upon de-energization of motor 10 at any time and for any reason, contacts 24 will not immediately be closed, but rather will close only following cooling of bimetallic element 28. Thus, if following initial energization of motor 10 and heating of bimetallic element 28 sufficiently open contacts 24, the line voltage is momentarily interrupted, contacts 24 will remain open thus permitting supplementary starting capacitor 22 at least partially to discharge through resistor 23 thereby preventing welding of contacts 24 due to capacitor discharge current therethrough.

It will be observed that thermal relay 26 operates on current in the starting winding circuit which is far lower than the current in the main winding. Further, contacts 24 are required only to "break" low level current flowing in supplementary starting capacitor 22 rather than being required to "make" and "break" current in the capacitor circuit as in the case of the prior current-responsive relay in the main winding circuit. Still further, thermal relay 26 is not position conscious and can be attached to any surface of the motor in any position.

Referring now to FIGS. 2 through 5, there is shown one form of thermal relay 26 which may be employed in the circuit of FIG. 1. Here, bimetallic element 28 is generally U-shaped with extremities 30 of its legs 28–1, 28–2 being secured by clamping assembly 32. Generally O-shaped relatively fixed, bimetallic contact-carrying member 34 is provided having end 36 joined to its legs 34–1, 34–2 also secured by clamping assembly 32. Fixed bimetallic member 34 compensates for variations in ambient temperature. Lead 38 is connected to leg 34–2 of the fixed contact-carrying member and to terminal 40 which is connected to running capacitor 20 (FIG. 1). Conductive washer 42 conductively connects ends 36 and 30 of legs 34–2 and 28–2 of the fixed contact-carrying member and the bimetallic element. Lead 44 is connected to leg 28–1 of the bimetallic element and to terminal 46 which is connected to starting winding 18.

Outer end 48 of the fixed contact-carrying member 34 has U-shaped portion 50 thereon which carries fixed contact 24–1. Generally O-shaped movable contact-carrying element 52 has end 54 joined to its legs 52–1, 52–2 secured by clamping assembly 32. Outer end 56 of movable contact-carrying element 52 carries movable contact 24–2. Lead 60 is connected to one leg 54 of movable contact-carrying element 52 and to terminal 62 which is connected to starting capacitor 22 (FIG. 1). Screw adjustment 58 determines the amount of flexure of bimetallic element 28 due to heating and thus the current flow in starting winding 18 necessary to open contacts 24.

Non-overcenter leaf spring 64 is connected between outer end 56 of movable contact-carrying element 52 and insulating member 66 secured to the outer end 67 of bimetallic element 28. Screw adjustment 68 establishes the position of movable contact-carrying element 52 in its contact-open position and thus determines the amount of flexure of bimetallic element 28 toward its cool position necessary to close contacts 24.

Figure 2:
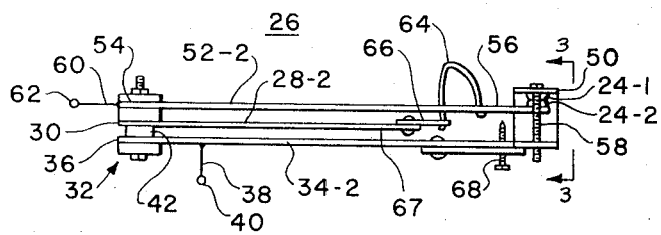
FIG. 2 is a side view of a thermal relay which may be employed in the circuit of FIG. 1.
Figure 3:
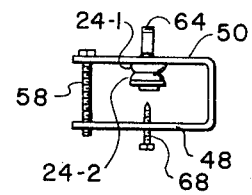
FIG. 3 is an end view of the relay as viewed along the line 3—3 of FIG. 2.
Figure 4:
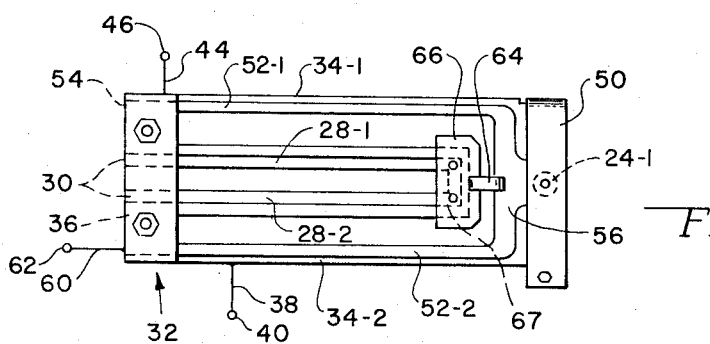
FIG. 4 is a top view of the relay of FIG. 2.
Figure 5:
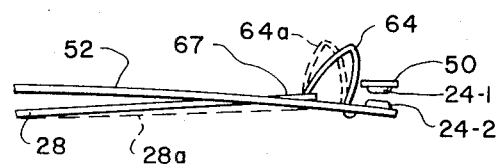
FIG. 5 is a fragmentary view showing the relay of the previous FIGURES with its contacts open.

Referring now particularly to FIG. 5, it will be understood that when bimetallic element 28 is heated due to starting current flowing therein, its outer end 67 will flex upwardly from its cool position as shown in FIG. 2 to the position shown in FIG. 5, at which position leaf spring 64 will actuate movable contact-carrying element 52 to open contacts 24 in snap-acting fashion. Once movable contact-carrying element 52 has been actuated by bimetallic element 28 and snap-acting spring 64 to open contacts 24, as shown in FIG. 5, bimetallic element 28 may cool and thus flex toward its fully cooled position to the position shown in dashed lines at 28a, before snap-acting leaf spring 64 will move past the position shown in dashed lines at 64a, at which spring 64 will actuate movable contact-carrying element 52 to close contacts 24. Thus, bimetallic element 28 in combination with snap-acting spring 64 will open contacts 24 in response to a first predetermined current in starting winding 18, i.e., the starting inrush current, and will maintain contacts 24 open thereafter in response to a second predetermined current in starting winding 18 lower than the first predetermined current, i.e., the normal running current in starting winding 18.

It will further be seen that in the event of de-energization of motor 10 at any time for any reason, an appreciable time delay is provided by cooling of bimetallic element 28 until contacts 24 are closed. In particular, under locked rotor conditions during which maximum current is flowing in starting winding 18, an even longer time delay is provided upon de-energization of motor 10 before contacts 24 are closed thus ensuring at least partial discharging of supplementary starting capacitor 22 through resistor 23 and eliminating arcing and welding of contacts 24.

It will be readily understood that the specific thermal relay 26 shown in FIGS. 2 through 5 and described above is illustrative only and that other types of thermal relays may be employed. For example, the bimetallic element may be heated by a resistive heater coupled in series with the starting winding, rather than being directly coupled in the starting circuit, as shown.

While there have been described above the principles of this invention in connection with specific apparatus, it is to be clearly understood that this description is made only by way of example and not as a limitation to the scope of the invention.

What is claimed is:

1. In a permanent split capacitor, single-phase, alternating current induction motor having a main field winding, means for coupling said main winding across a source of single-phase, alternating current potential, a starting field winding, a running capacitor, a supplementary starting capacitor, and normally closed switch contacts coupling said supplementary starting capacitor across said running capacitor,; a starting circuit comprising a first bimetallic element, said starting winding, first bimetallic element and running capacitor being serially coupled across said main winding, a second ambient temperature-compensating bimetallic element carrying one of said switch contacts, a movable contact element carrying the other of said switch contacts, and means coupling said first bimetallic element to said movable element for actuating the same to open said contacts in response to flexure of said first bimetallic element whereby said contacts are opened in response to a first predetermined current flow in said starting winding and maintained open in response to a second predetermined current flow in said starting winding less than said first current flow.

2. The starting circuit of claim 1 wherein said coupling means comprises a non-overcenter snap-acting spring whereby said movable contact element is actuated to open said contacts in response to flexure of said bimetallic element away from a normal position by a first predetermined amount, and said movable contact element is actuated to open said contacts in response to flexure of said bimetallic element toward said normal position by a second predetermined amount.

3. The starting circuit of claim 2 wherein said first bimetallic element is generally U-shaped, said second bimetallic element being elongated and having said one switch contact carried on one end, said movable contact element being generally elongated and having said other switch contact carried on one end, said spring coupling the outer end of said first bimetallic element and said one end of said movable contact element, and further comprising means for clamping the ends of the legs of said first bimetallic element and the other ends of second bimetallic element and said movable contact element.

* * * * *